(12) United States Patent
Courcier et al.

(10) Patent No.: US 10,876,694 B2
(45) Date of Patent: Dec. 29, 2020

(54) LIGHT BEAM PROJECTION DEVICE PROVIDED WITH SUBMATRICES OF LIGHT SOURCES, LIGHTING AND HEADLIGHT MODULE PROVIDED WITH SUCH A DEVICE

(71) Applicant: VALEO VISION, Bobigny (FR)

(72) Inventors: Marine Courcier, Paris (FR); Vanesa Sanchez, Bois Colombes (FR)

(73) Assignee: VALEO VISION, Bobigny (FR)

( * ) Notice: Subject to any disclaimer, the term of this patent is extended or adjusted under 35 U.S.C. 154(b) by 279 days.

(21) Appl. No.: 15/437,537

(22) Filed: Feb. 21, 2017

(65) Prior Publication Data

US 2017/0241606 A1 Aug. 24, 2017

(30) Foreign Application Priority Data

Feb. 22, 2016 (FR) ...................................... 16 51415

(51) Int. Cl.
*F21S 41/143* (2018.01)
*F21S 41/25* (2018.01)
(Continued)

(52) U.S. Cl.
CPC ........... *F21S 41/143* (2018.01); *F21S 41/153* (2018.01); *F21S 41/25* (2018.01); *F21S 41/255* (2018.01);
(Continued)

(58) Field of Classification Search
CPC ........ F21S 41/141; F21S 41/143; F21S 41/25; F21S 41/255; F21S 41/285; F21S 41/153; F21S 41/30; F21S 41/663; B02B 27/0025
See application file for complete search history.

(56) References Cited

U.S. PATENT DOCUMENTS

| 5,515,253 A | * | 5/1996 | Sjobom | ................. B60Q 1/503 257/E33.067 |
| 2008/0043485 A1 | * | 2/2008 | Koerner | ................ F21V 17/101 362/521 |

(Continued)

FOREIGN PATENT DOCUMENTS

| CN | 1948821 A | 4/2007 |
| DE | 10 2008 061 556 A1 | 9/2009 |

(Continued)

OTHER PUBLICATIONS

English Machine translation of DE102014110599 provided by Espacenet (Year: 2016).*

(Continued)

*Primary Examiner* — Zheng Song
(74) *Attorney, Agent, or Firm* — Oblon, McClelland, Maier & Neustadt, L.L.P.

(57) ABSTRACT

An optical light beam projection device, notably for a motor vehicle, includes upstream in the direction of propagation of the light rays, a set of at least two associated submatrices each provided with primary light sources capable of emitting light rays. Downstream, a primary optical system is provided with a plurality of convergent optics, at least one convergent optic being associated with each submatrix and arranged downstream thereof, the separation between the optical axes of two adjacent convergent optics corresponds respectively to the separation between the centers of the corresponding adjacent submatrices. Another subject of the invention is an optical module comprising the device and a motor vehicle headlight.

15 Claims, 5 Drawing Sheets

Figure 1:
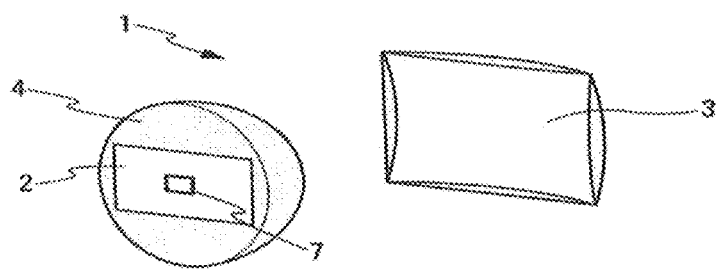

(51) Int. Cl.
*F21S 41/20* (2018.01)
*F21S 41/255* (2018.01)
*F21S 41/30* (2018.01)
*F21S 41/663* (2018.01)
*F21S 41/153* (2018.01)
*G02B 27/00* (2006.01)
*F21Y 101/00* (2016.01)
*F21Y 105/10* (2016.01)
*F21W 102/00* (2018.01)
*F21Y 115/10* (2016.01)

(52) U.S. Cl.
CPC ............. *F21S 41/285* (2018.01); *F21S 41/30* (2018.01); *F21S 41/663* (2018.01); *G02B 27/0025* (2013.01); *F21W 2102/00* (2018.01); *F21Y 2101/00* (2013.01); *F21Y 2105/10* (2016.08); *F21Y 2115/10* (2016.08)

(56) References Cited

U.S. PATENT DOCUMENTS

| | | | | |
|---|---|---|---|---|
| 2010/0195342 | A1* | 8/2010 | Lambert | G02B 6/0096 362/511 |
| 2012/0300486 | A1* | 11/2012 | Matsushita | G02B 27/01 362/521 |
| 2014/0175978 | A1* | 6/2014 | Kobayashi | B60Q 1/1423 315/82 |
| 2014/0204602 | A1* | 7/2014 | Jungwirth | F21S 41/143 362/521 |
| 2014/0307459 | A1 | 10/2014 | Brendle et al. | |
| 2015/0241009 | A1 | 8/2015 | Brendle | |
| 2017/0097132 | A1* | 4/2017 | Hager | F21V 14/06 |
| 2017/0114975 | A1* | 4/2017 | Hiki | F21S 41/47 |

FOREIGN PATENT DOCUMENTS

| | | | | |
|---|---|---|---|---|
| DE | 102014110599 | * | 7/2014 | ............. F21S 41/14 |
| DE | 10 2014 210 500 A1 | | 12/2015 | |
| DE | 102014110599 | * | 1/2016 | ................ F21S 8/12 |
| EP | 1 213 178 A2 | | 6/2002 | |
| EP | 2 357 399 A1 | | 8/2011 | |
| EP | 2357399 | * | 8/2011 | ............. F21V 5/007 |
| EP | 2 752 615 A1 | | 7/2014 | |
| EP | 2 789 900 A2 | | 10/2014 | |
| EP | 2 910 847 A2 | | 8/2015 | |

OTHER PUBLICATIONS

French Preliminary Search Report dated Oct. 25, 2016 in Patent Application No. FR 1651415 (with English translation of categories of cited documents).

* cited by examiner

LIGHT BEAM PROJECTION DEVICE PROVIDED WITH SUBMATRICES OF LIGHT SOURCES, LIGHTING AND HEADLIGHT MODULE PROVIDED WITH SUCH A DEVICE

The present invention relates to a light beam projection device, notably for a motor vehicle, and a light beam headlight, of low beam or high beam type, provided with such a projection device.

Motor vehicle headlights are provided with one or more optical modules arranged in a housing sealed by a front lens so as to obtain one or more light beams at the output of the headlight. To put it simply, an optical module of the housing comprises, in particular, a light source, for example one (or more) light-emitting diode(s), which emit light rays, and an optical system comprising one or more lenses and, if appropriate, a reflector, to orient the light rays from the light source in order to form the output light beam of the optical module.

It is known that some motor vehicle headlights are capable of varying the orientation of the light beam according to the needs of the driver of the vehicle. Thus, when the vehicle performs a turn, an electronic system onboard the vehicle orders a modification of the orientation of the light beam in order to adapt it to the field of view of the driver during the maneuver. The headlight then displaces the axis of the light beam in the direction of rotation of the vehicle in order to illuminate the road rather than project the beam straight ahead.

Other known headlights can fulfill the low beam and high beam functions, with the same light source. To this end, the headlights use mechanical means which display an element, called beam bender, to cut off a part of the beam. Furthermore, there is also a lighting of low beam type designed for motorways, the beam of which passes slightly above the cutoff of the usual low beam in order to improve the road visibility when the vehicle is moving on a motorway.

Thus, it is desirable to be able to control the light rays emitted by the source to modify the dimensions of the light beam leaving the headlight and manage to perform all the abovementioned functions.

To achieve this, the document DE 102008 061 556 describes a lighting device provided with a matrix of light-emitting diodes, each diode being individually addressable. The diodes are arranged alongside one another, each diode emitting a component of the light beam leaving the headlight. This device thus makes it possible to control the dimensions of the light beam by activating a proportion of the light-emitting diodes corresponding to the desired beam size.

However, the current diode matrices do not make it possible to obtain a uniform light beam. In effect, since the diodes are spaced apart by a minimum distance, a gap appears between the different light beams that make up the beam, a gap which corresponds to the spacing of the diodes.

Furthermore, in the current lighting systems, an increased resolution of the beam is required, the needs in terms of number of pixels therefore being significant. Thus, the number of light sources, which can range from 100 to 600, even more, must be high to meet this need.

Now, the diode matrices comprising such a number of sources have a number of additional disadvantages. The first disadvantage lies in the production cost of such assemblies, because, on the one hand, they are not produced in fairly large numbers, and, on the other hand, their production is more expensive because it is more complex. A second disadvantage stems from the fragility of such a matrix which requires particular care in its handling in order to avoid any damage.

The invention therefore aims to obtain an optical module configured to project a light beam whose dimensions and orientation can be modified and which avoids the abovementioned drawbacks.

For that, the invention relates to an optical light beam projection device, notably for a motor vehicle, comprising, upstream in the direction of propagation of the light rays, a set of at least two associated submatrices each provided with primary light sources capable of emitting light rays, and, downstream, a primary optical system provided with a plurality of convergent optics, at least one convergent optic being associated with each submatrix and arranged downstream thereof, the separation between the optical axes of two adjacent convergent optics corresponds respectively to the separation between the centers of the corresponding adjacent submatrices.

Furthermore, in the present application, a matrix of primary sources should be understood to mean a set of primary sources arranged according to at least two columns by at least two rows, preferably at least ten columns by at least three rows.

An assembly composed of at least two primary sources, arranged in rows or in columns, is then called submatrix. For example, a submatrix can comprise one row and two columns of diodes. Preferably, it can comprise at least two rows and at least two columns of diodes. Advantageously, the matrix of sources implemented can be made up of submatrices of several different sizes.

To measure the separation, a position will be adopted notably in orthogonal projection on a plane parallel to the emitting surfaces of the primary sources. If the submatrices are positioned in a first plane and the convergent optics have their optical axes at right angles to a second plane passing through said optics, preferably parallel to the first, the respective separation will be measured in projection on each of the planes considered, or just one of them if the two planes are parallel.

Advantageously, the convergent optics are configured to form virtual images of the submatrices, the virtual images being formed upstream of the submatrices of primary sources, such that the dimensions of the virtual images are greater than the dimensions of the submatrices.

In addition, the formation of virtual images makes it possible to obtain a better compactness along the optical axis of the device compared to a device effecting a real image of the primary light sources, downstream of the primary light sources.

Thus, the invention makes it possible to use and associate submatrices in order to form a matrix of light sources of large size. The need to fabricate such matrices of a single piece (monolithic matrix) is thus avoided, which makes it possible to lower the production costs, and reduce the losses in case of damage. Furthermore, the size of the assembly of submatrices can easily be chosen by juxtaposing the submatrices as desired, without having to each time fabricate a large matrix of appropriate size.

Furthermore, since the virtual images are formed upstream of the submatrices of light sources, they are enlarged and therefore minimize the gap between the beams produced by the sources of the different submatrices. In a preferred embodiment, the primary optical system is configured such that the virtual images are juxtaposed or substantially juxtaposed, thus producing a good uniformity of the distribution of light between the submatrices, but also within them, between the sources which make up said submatrices.

According to different embodiments of the invention, which will be able to be taken together or separately:

the primary optical system is arranged such that the virtual images of the submatrices are substantially adjacent to form a uniform light distribution, the primary optical system is configured to form the virtual images in a plane, a convergent optic is arranged downstream of each primary light source;

each convergent optic comprises a convergent input micro-dioptre;

each convergent optic comprises an input micro-dioptre with at least one convex portion;

the convergent input micro-dioptres have a planar surface, the primary optical system comprises a single output dioptre for all the convergent optics or all the input micro-dioptres, the output dioptre is configured to correct the optical aberrations, the output dioptre has a substantially spherical form, the output dioptre has an elongate form, with a bifocal definition;

the primary optical system comprises an output micro-dioptre for each input micro-dioptre in order to obtain biconvex lenses as optics, the primary optical system comprises an output dioptre for each submatrix, the primary optical system is made of a single material, that is to say that its various constituent elements are all of the same material;

the primary optical system comprises two separate optical elements each made of the same material, the first optical element comprising the input dioptres, the second optical element comprising the output dioptres, the primary light sources are light-emitting diodes.

In the context of the present invention, micro-dioptre is used to designate dioptres whose outer dimensions are less than or equal to 5 times the dimensions of the primary light source or of the associated submatrix of primary light sources. They are generally of a millimetric order of magnitude. Thus, for example, for an individual light-emitting diode (LED) whose emitting surface has a side measurement of 1 mm, the dimensions of the associated dioptre lie within a square with a maximum side diameter of 5 mm. If the primary source is made up of a submatrix of LEDs, it is the dimensions of the submatrix which will be considered.

Furthermore, if the primary sources are all of the same dimension, it will be possible to provide for all the micro-dioptres to have the same dimension. Advantageously however, it will also be possible to provide for the dioptres associated with the sources at the edges of the matrix, notably at the lateral extremities, to be of larger dimensions than the others in order to form a laterally and vertically elongate virtual image which will give a projected light pattern of larger size than the others, notably to produce an illumination of the sidewalks.

The invention relates also to an optical module comprising such a projection device and projection means, such as a projection lens or a reflector, arranged downstream of the primary optical system in the direction of projection of the light beam, the projection means being capable of projecting a light beam from the virtual images serving as light sources for the projection means which are focused on said virtual images.

This last feature of the invention is particularly interesting and advantageous. In effect, the focusing of the projection means on the virtual images, notably on the plane containing said virtual images, makes the optical projection module insensitive to the production defects of the primary optical system: if the projection means are focused on the surface of the dioptres, it is this surface which is imaged and therefore all its production defects are made visible, which can generate defects of uniformity or of chromatism in the projected light beam. Furthermore, that makes it possible to use a submatrix of light sources in association with the primary optic, each source and/or submatrix of sources being individually imaged.

The invention relates also to a motor vehicle headlight provided with such an optical module.

Figure 2:
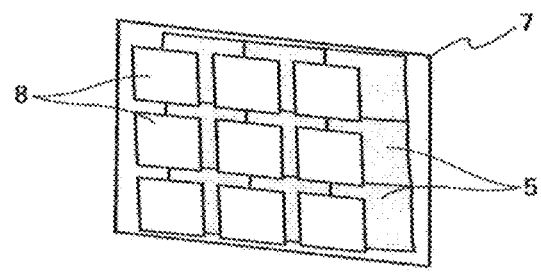
Figure 3:
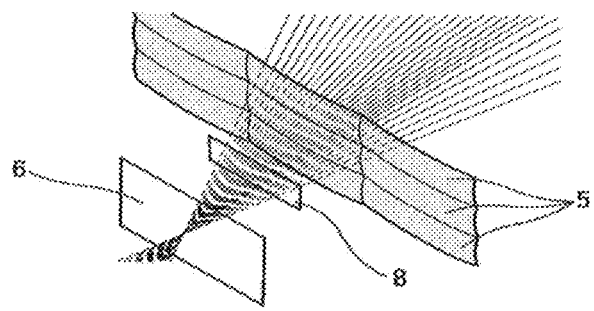
Figure 4:
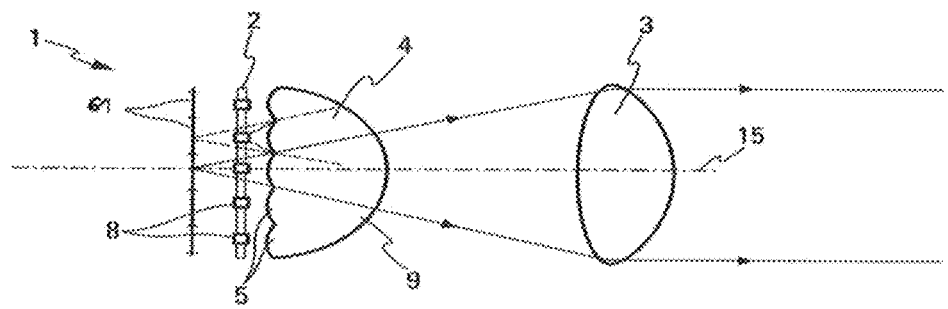
Figure 5:
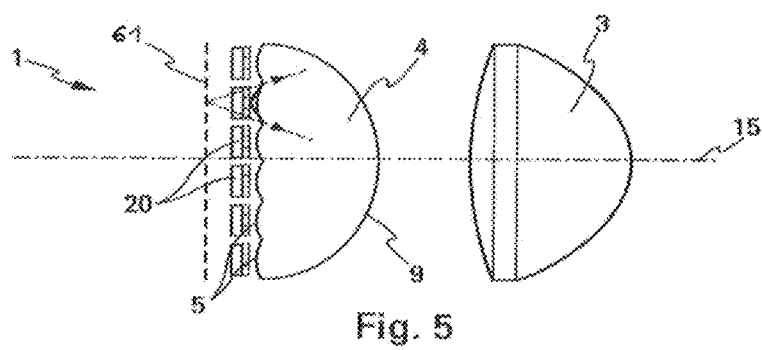
Figure 6:
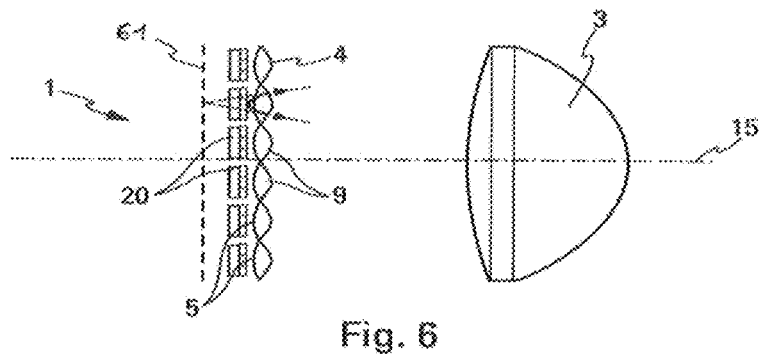
Figure 7:
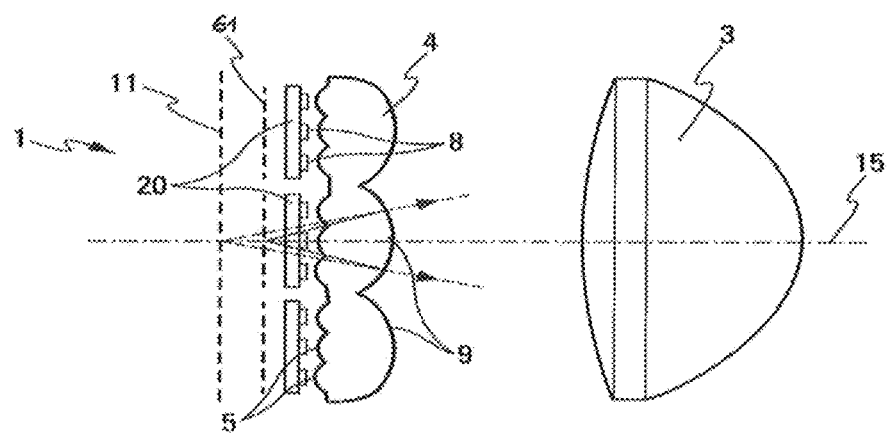
Figure 8:
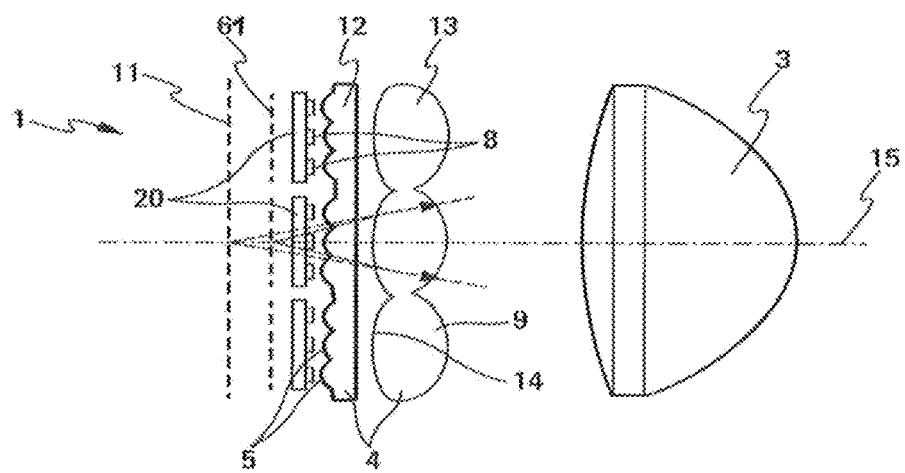
Figure 9:
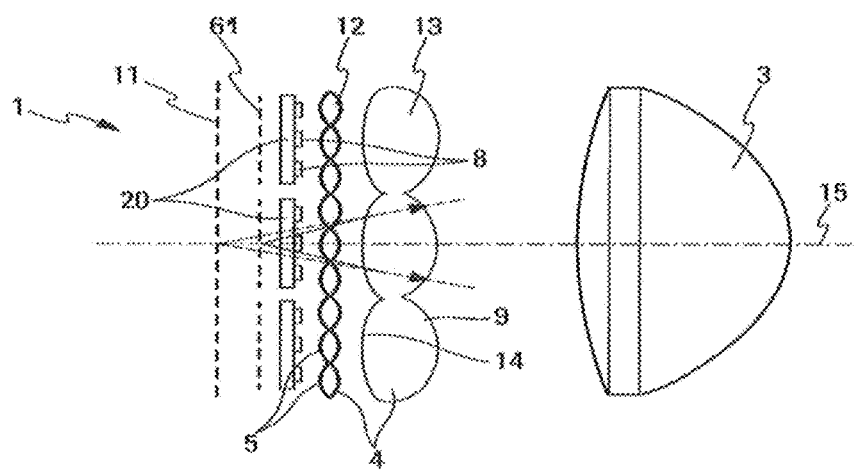
Figure 10:
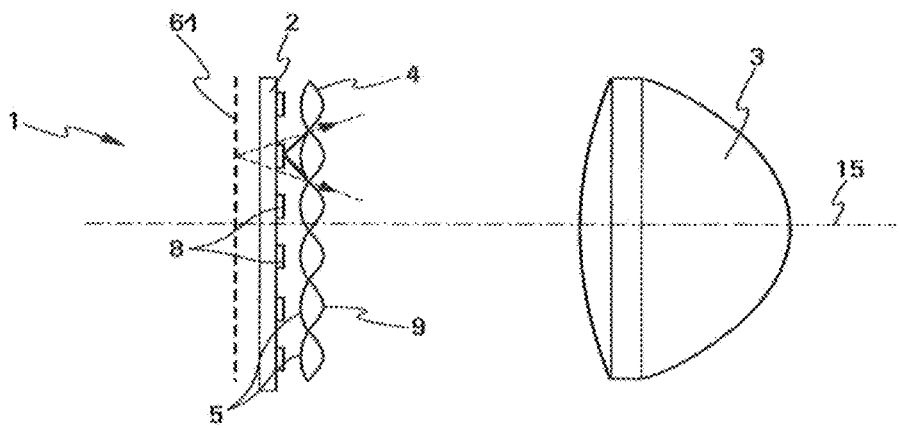
Figure 11:
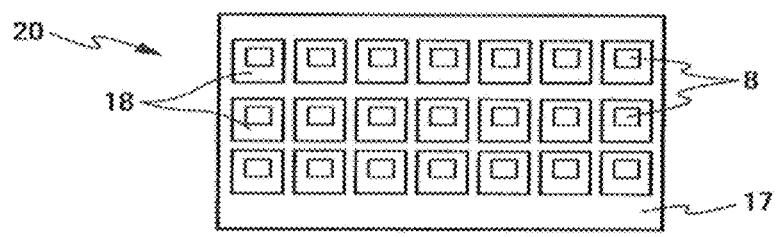
Figure 12:
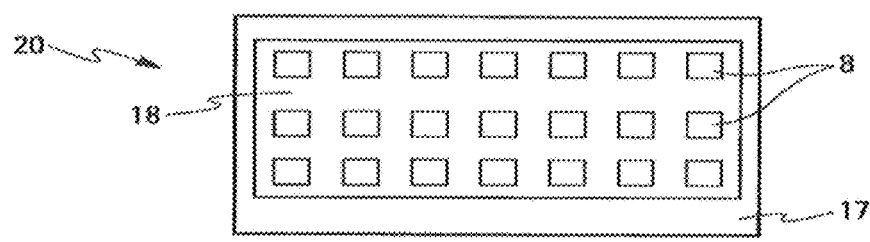
Figure 13:
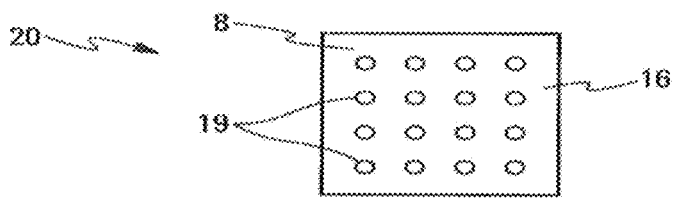
Figure 14:
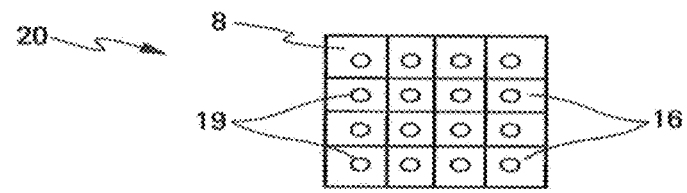

The invention will be better understood in light of the following description which is given only as an indication and the aim of which is not to limit it, accompanied by the attached drawings:

FIG. 1 schematically illustrating a perspective view of a first embodiment of a projection module according to the invention, FIG. 2 schematically illustrating an enlarged perspective view of a part of the projection module of FIG. 1, FIG. 3 schematically illustrating a perspective view of the formation of a virtual image on the part of the projection module of FIG. 2, FIG. 4 schematically illustrating a side view of the first embodiment of a projection module according to the invention, FIG. 5 schematically illustrating a side view of a first variant of a second embodiment of a projection module according to the invention, FIG. 6 schematically illustrating a side view of a second variant of the second embodiment of a projection module according to the invention, FIG. 7 schematically illustrating a side view of a third variant of the second embodiment of a projection module according to the invention, FIG. 8 schematically illustrating a side view of a fourth variant of the second embodiment of a projection module according to the invention, FIG. 9 schematically illustrating a side view of a fifth variant of the second embodiment of a projection module according to the invention, FIG. 10 schematically illustrating a side view of a production variant of the first embodiment, FIG. 11 schematically illustrating a front view of a first type of matrix of light sources, FIG. 12 schematically illustrating a front view of a second type of matrix of light sources, FIG. 13 schematically illustrating a front view of a third type of matrix of light sources, FIG. 14 schematically illustrating a front view of a fourth type of matrix of light sources.

FIGS. 1 to 4 show a first embodiment of an optical light beam projection module 1, notably for a motor vehicle. The module 1 comprises, from upstream to downstream in the direction of propagation of the light rays along the optical axis 15, a matrix 2 of primary light sources 8 capable of emitting light rays, a primary optical system 4 which transmits the light rays, and projection means configured to project a light beam from the incident light rays transmitted by the optical primary optical system 4.

In the figures, the projection means take the form of a single projection lens 3. The projection means could nevertheless be formed by the association of equipped with a plurality of lenses, a plurality of reflectors, or even a combination of one or more lenses and/or one or more reflectors.

The primary light sources 8 are, for example, light-emitting diodes forming an array on the matrix 2, as represented in FIG. 2. These matrices 2 of light-emitting diodes are known and available in the market.

The function of the primary optical system 4 is to transmit light rays from the diodes such that, when combined with the projection means, here in the form of a projection lens 3, the beam projected out of the module, for example onto the road, is uniform. To this end, the primary optical system 4 is provided with a plurality of convergent optics, which are preferably convergent input micro-dioptres 5. Here, the input micro-dioptres 5 have a convex surface, that is to say that they are domed outward, toward the sources 8. The surface could however be planar, planar-convex or concave-convex. An input micro-dioptre 5 is advantageously arranged downstream of each light source 8, that is to say of each light-emitting diode or submatrix of diodes of the matrix 2, as shown in FIG. 2. The input micro-dioptres 5 form virtual images 6 of the primary light sources 8, as is shown in FIG. 3.

The virtual images 6 are formed upstream of the matrix 2 of primary sources 8, and thus serve as new light sources for the projection lens. The virtual images 6 obtained are enlarged and preferably substantially adjacent. In other words, they are not separated by a significant space. Furthermore, the adjacent virtual images can exhibit a slight overlap with one another, which will translate into an overlapping of their respective projections by the projection means measured on a screen placed at 25 m from the device which will preferably be less than 1°. In fact, in the design of the primary optical system, it will be sought to ensure that the virtual images are juxtaposed from a paraxial point of view, with a tolerance margin to ensure the robustness with respect to the positioning accuracy of the light sources and with respect to the production defects of the surfaces of the micro-dioptres: the edges of each virtual image will be blurred, so as to obtain this slight overlap which will ensure a good uniformity of the light beam generated. The primary optical system 4 therefore makes it possible to form virtual images 6 of the primary light sources 8 in order to obtain a uniform distribution of the beam, that is to say that the components of the light beam are correctly adjusted relative to one another, with no dark strips and/or bright strips (over intense) between them which would be detrimental to the driving comfort.

Furthermore, the virtual images 6 are more distant from the projection lens 3 in relation to the real matrix of the light sources, which makes it possible to keep a compact optical module.

The primary optical system 4 is advantageously configured to form virtual images 6 in a plane 61, the dimensions of the virtual images 6 being greater than the dimensions of the primary light sources 8. As FIG. 4 shows, the enlargement of the size of the virtual images 6 allows for a juxtapositioning of the virtual images 6 in the plane 61 so as to be adjacent to one another. To this end, the convex curvature and the material forming the micro-dioptre are matched to the dimensions of the matrix 2 of primary sources 8, as is the positioning of the optical primary optical system 4 relative to the matrix 2, such that the virtual images 6 are correctly juxtaposed. Depending on the size of the submatrices and the enlargement sought, the distance between the submatrices and the primary optical system 4 will be, limits included, 25 to 200% of the size of the submatrix, preferably 50 to 100%, for example with a distance of 1 to 7 mm, limits included.

For greater clarity, the virtual images 6 have not been represented in FIGS. 4 to 10. Only the plane 61 in which these virtual images 6 are situated has been represented.

The optical module 1 of FIG. 4 comprises the matrix 2 of primary light sources 8, the primary optical system 4 provided with the input micro-dioptres 5 and projection means formed by the projection lens 3. The primary optical system 4 also comprises a single output dioptre 9 for all the input micro-dioptres 5.

The output dioptre 9 provides an optical correction of the beam transmitted to the projection lens 3. The correction serves notably to improve the optical efficiency of the device and to correct the optical aberrations of the system 4. To this end, the output dioptre 9 has a substantially spherical dome form. This form barely deflects the direction of the light rays of the beam originating from a source arranged on the optical axis 15, and which pass through the output dioptre 9.

In the production example represented, the output dioptre 9 has a substantially spherical dome form.

According to a variant not represented, it will have an elongate form, of cylindrical type, with a bifocal definition. Seen from the front, the output dioptre 9 is wider than it is high. According to a preferred example of production of this variant, the output dioptre 9 has, in horizontal section, and therefore in the widthwise direction, a great radius of curvature, with a deflection of less than 5 mm. The surface in horizontal section can be convex or concave, that is to say that the output dioptre 9 is respectively convergent or divergent, the latter alternative being particularly interesting to reduce the bulk of the optical device. Still according to this preferred production example, in vertical section—and therefore in its heightwise direction—the surface of the output dioptre 9 is aspherical, with a spherical approximation of the first order which has a radius of between 5 and 10 mm, inclusive.

In this first embodiment, the primary optical system 4 is made of a single material, i.e. of the same material. In other words, the input micro-dioptres 5 and the output dioptre 9 form the input and output faces of one and the same element, the primary optical system 4, which is like a complex lens.

In a variant of the first embodiment, represented in FIG. 10, the primary optical system 4 comprises an output micro-dioptre 9 for each input micro-dioptre 5. The primary optical system 4 then forms a set of biconvex microlenses, each microlens being arranged in front of a primary light source. The microlens does not however make it possible to correct the overall beam transmitted, like a primary optical system 4 provided with a single output dioptre 9. These microlenses are similar to those of the second variant of the second embodiment represented in FIG. 6, described hereinbelow. They have the advantage of providing a better uniformity of the virtual images and less deformation of the images.

In a second embodiment, represented in FIGS. 5 to 8, the device comprises a plurality of submatrices 20 of primary light sources 8, in place of the matrix 2 of the preceding embodiment. The submatrices 20 of light-emitting diodes are more easy to handle and less costly than the matrices of large size. Thus, it is more cost-effective to obtain a matrix of large size by associating a plurality of submatrices 20. Such a composition can contain from 100 to 600 light-emitting diodes.

FIGS. 11 to 14 represent different types of matrices which can serve as submatrix of the device according to the invention. Such a matrix comprises at least two different light emission zones, which are individually addressable.

FIG. 11 shows a multi-chip matrix 20 of light sources 8, of light-emitting diode type, each source 8 being individually addressable. Each source 8 is fabricated separately on an independent chip, which is mounted on a holding element 18, itself assembled with the other sources on a support 17. FIG. 12 represents a second type of multi-chip matrix 20 in which the light-emitting diodes are preassembled with one another on a common holding element 18 arranged on a support 17.

FIGS. 13 and 14 illustrate single-chip matrices 20, in which the light sources 8 have an electrode in common. A diode with two electrodes 16, 19 in contact, a first spot electrode 19 and a second surface electrode 16. In FIG. 13, the sources 8 are individually addressable by activating the first electrode 19, the second electrode being the same for all the sources 8 of the chip. On the other hand, the light sources 8 of FIG. 14 have a second electrode 19 divided into portions so as to have an independent second electrode 19 for each source 8, the first electrode 16 being simultaneously activatable.

According to a particular variant embodiment, the light submatrices 20 can be based on a semiconductor light source comprising a plurality of light-emitting units of submillimetric dimensions, the units being distributed in different, selectively activatable light zones. In particular, each of the light-emitting light units of submillimetric dimensions takes the form of a rod. Furthermore, the rods are on one and the same substrate, which preferably comprises silicon.

The primary optical system 4 associates the light rays from the submatrices 20 in order to form a single beam having the same properties as in the embodiment provided with a single matrix. The invention therefore makes it possible not only to use standard components present on the market, but also avoids the problems of thermal expansion that occur on components of large size.

The beams formed by the different submatrices 20 complement one another, advantageously with a slight superposition of the beams which does not exceed 1° of aperture angle of each beam. Superimposing the different beams with a greater angle is avoided in order to maintain a discretization of the components and retain a projected beam whose outlines are well defined.

FIG. 5 shows a first variant embodiment of an optical projection module 1 comprising, upstream, a plurality of submatrices 20 and, downstream, projection means 3 such as a projection lens. The optical device comprises, also between the submatrices 20 and the projection lens 3, a primary optical system 4 provided with a plurality of convergent optics here having convergent input micro-dioptres 5, here having a convex surface, and configured to form virtual images 6 in one and the same plane 61. The input micro-dioptres 5 are arranged downstream of the submatrices 20, an input micro-dioptre 5 corresponding to a submatrix 20 of primary light sources 8.

The virtual images 6 of the light sources are formed in one and the same plane 61, upstream of the submatrices 20, such that the dimensions of the virtual images 6 are greater than the dimensions of the submatrices 20, the virtual images 6 then serving as light sources for the projection lens 3.

As in the embodiment of FIG. 4, the primary optical system 4 of FIG. 5 has a single output dioptre 9, formed to provide an optical correction of the beam transmitted to the projection lens 3, the output dioptre 9 also having a convex dome form. Furthermore, the primary optical system 4 is also an optical element made of a single material.

In a second variant of the second embodiment, represented in FIG. 6, the primary optical system 4 comprises an output micro-dioptre 9 for each input micro-dioptre 5. Here, the function of the output dioptre 9 is not to correct the transmitted beam. The primary optical system 4 then forms a set of biconvex microlenses. In this embodiment, the module comprises submatrices 20 of primary light sources 8, each biconvex microlens being arranged downstream of a submatrix 20.

FIG. 7 shows a third variant of the second embodiment of the optical module 1 according to the invention, and which comprises a primary optical system 4 provided with convergent optics with convex input micro-dioptres 5, arranged downstream of the submatrices 20 of primary light sources 8. An input micro-dioptre 5 corresponds to a primary light source 8 of each submatrix 20. In this variant embodiment, the primary optical system 4 comprises an output dioptre 9 for each submatrix 20. The output dioptre 9 and the input micro-dioptres 5 of each lens are in continuity of material, such that they form a complex lens. The complex lenses of the primary optical system 4 can also be linked to one another. Thus, the output dioptre 9 generates an enlarged virtual image of the submatrix, in order for the beams of each submatrix 20 to be adjusted relative to one another. Furthermore, an output dioptre 9 for each submatrix 20 avoids the parasitic rays between beams from different submatrices.

Furthermore, in this case, the output dioptres 9 and the input micro-dioptres 5 form part of a primary optical system 4 made of a single piece. In other words, the primary optical system 4 comprises only a single element.

FIG. 8 describes a fourth variant of the second embodiment, which is similar to the third variant of FIG. 7, the difference lying in the primary optical system 4 which is separated into two elements 12, 13. The first element 12 comprises the input micro-dioptres 5 and a substantially planar single output face for all the input micro-dioptres 5. The second element 13 is provided with an input face having a convex dioptre 14 for each submatrix 20, and output dioptres 9 also for each submatrix 20.

The fifth variant of FIG. 9 is substantially the same as the fourth variant. The form of the first element 12 differs in that it comprises a set of biconvex microlenses, in a way similar to the second variant of FIG. 6. The second part 13 is substantially the same as in the fourth variant.

The optical systems 4 of the third, fourth and fifth variants are particularly well suited to the submatrices 20 in which the primary light sources 8 are distant from one another. Distancing of more than 5% of the width of the primary light source 8 can be considered as a significant distance. Thus, the input micro-dioptres 5 placed downstream of each primary light source 8 make it possible, within a submatrix, according to the process described previously, for the light supplied by the primary sources 8 to be made uniform. The function of the output dioptres 9 placed downstream of each submatrix 20 is to make a second virtual image, in a plane 11, that is uniform between these submatrices.

When there is an input dioptre 14 dedicated to each submatrix (case of FIGS. 8 and 9), the association of the output dioptre 9 and of the input dioptre 14 creates the virtual images between submatrices. Advantageously, fewer geometrical deformations of the image are thus generated. This standardization between the submatrices 20 This standardization between the submatrices is above all useful in as much as the distance between the submatrices is greater than that separating the light sources 8.

The advantages obtained by virtue of the invention described in the first embodiment are also obtained in the variants of the second embodiment.

The invention claimed is:

1. An optical light beam projection device for a motor vehicle, the optical light beam projection device comprising:
   in an upstream direction of propagation of light rays, a set of at least two associated submatrices each provided with primary light sources capable of emitting the light rays, each of the submatrices including a set of the primary light sources arranged as a rectangular array of at least two columns by at least two rows, each of the submatrices being disposed on a separate substrate;
   in the direction opposite to the upstream direction, a primary optical system including a lens, the lens having an input surface and an output surface, the input surface provided with a plurality of convergent optics, each convergent optic having a convex surface, each convex surface being associated with each of the submatrices disposed on the separate substrate and arranged in the direction opposite to the upstream direction thereof, the output surface of the lens having a plurality of sub-lenses, each sub-lenses having a parabolic shape, each of the sub-lenses having the parabolic shape outputting the light rays from corresponding plurality of convergent optics, a first separation between optical axes of two adjacent convergent optics corresponds respectively to a second separation between centers of corresponding adjacent submatrices.

2. The optical light beam projection device according to claim 1, wherein each convergent optic comprises an input micro-dioptre with at least one convex portion.

3. The optical light beam projection device according to claim 2, wherein the primary optical system comprises a single output dioptre for all the convergent optics.

4. The optical light beam projection device according to claim 3, wherein the single output dioptre is configured to correct optical aberrations.

5. The optical light beam projection device according to claim 4, wherein the single output dioptre has a substantially spherical form.

6. The optical light beam projection device according to claim 2, wherein the primary optical system comprises an output dioptre for each of the submatrices.

7. The optical light beam projection device according to claim 1, wherein the convergent optics are configured to form virtual images of the submatrices, the virtual images being formed in the upstream of the submatrices of the primary light sources, such that first dimensions of the virtual images are greater than second dimensions of the submatrices.

8. The optical light beam projection device according to claim 7 wherein the primary optical system is arranged such that the virtual images of the submatrices are substantially adjacent to form a uniform light distribution.

9. An optical light beam projection module for motor vehicle lighting, the optical light beam projection module comprising the optical light beam projection device according to claim 1, and a projection lens or a reflector, arranged in the primary optical system in a downstream direction of projection of a light beam, the projection lens or the reflector being capable of projecting the light beam from virtual images serving as light sources to the projection lens or the reflector which are focused on a plane of the virtual images.

10. A motor vehicle headlight comprising the optical light beam projection module according to claim 9.

11. The optical light beam projection device according to claim 1, wherein the convergent optics are configured to form virtual images of the submatrices and the primary optical system is configured to form the virtual images in a plane.

12. The optical light beam projection device according to claim 1, wherein each convergent optic is arranged in a downstream of each primary light source.

13. The optical light beam projection device according to claim 1, the primary optical system is made of an integral single piece of material.

14. The optical light beam projection device according to claim 1, wherein the plurality of convergent optics are made of an integral single piece of material.

15. The optical light beam projection device according to claim 1, wherein the primary light sources are light-emitting diodes.

* * * * *